(12) United States Patent
Sancho (10) Patent No.: US 6,421,995 B1
(45) Date of Patent: Jul. 23, 2002

(54) MACHINE FOR HARVESTING TREE FRUIT

(75) Inventor: Javier Tenias Sancho, Zaragoza (ES)

(73) Assignee: Tenias, S.A. (ES)

( * ) Notice: Subject to any disclaimer, the term of this patent is extended or adjusted under 35 U.S.C. 154(b) by 0 days.

(21) Appl. No.: 09/804,558

(22) Filed: Mar. 12, 2001

(30) Foreign Application Priority Data

Sep. 8, 2000 (ES) .............................................. 0002278
Nov. 24, 2000 (ES) .............................................. 0002889

(51) Int. Cl.[7] .......................................... A01D 46/00
(52) U.S. Cl. ...................................... 56/340.1; 56/330
(58) Field of Search ................................ 56/12.8, 14.3, 56/328.1, 340.1, 329; 180/215, 210

(56) References Cited

U.S. PATENT DOCUMENTS

| | | | |
|---|---|---|---|
| 3,473,310 A | | 10/1969 | Christianson ................. 56/329 |
| 3,596,455 A | | 8/1971 | Adrian ......................... 56/329 |
| 3,683,617 A | | 8/1972 | Vallicella ..................... 56/329 |
| 3,901,005 A | * | 8/1975 | Rohrbach et al. ............. 56/330 |
| 4,194,347 A | | 3/1980 | Peters .......................... 56/328 |
| 4,286,426 A | * | 9/1981 | Orlando et al. ................ 56/330 |
| 5,259,177 A | * | 11/1993 | Windemuller et al. ......... 56/330 |
| 5,513,484 A | * | 5/1996 | Zehavi et al. .............. 56/329 X |
| 6,070,402 A | | 6/2000 | Korthuis et al. .............. 56/330 |

FOREIGN PATENT DOCUMENTS

| | | | |
|---|---|---|---|
| ES | 2017249 | 1/1991 | .................... 46/26 |
| ES | 2130879 | 7/1999 | .................... 46/26 |
| FR | 2281056 | 3/1976 | .................... 46/24 |

* cited by examiner

Primary Examiner—Robert E. Pezzuto
(74) Attorney, Agent, or Firm—Ostrolenk, Faber, Gerb & Soffen, LLP (57) ABSTRACT

Machine for harvesting tree fruit comprising two parallel, vertical gantries joined at the bottom of their vertical side arms by longitudinal frames extending inward from the insides of the arms and joining the two arms on one side. A duct receives fruit conveyed by a screw container, to an end of the duct with a peeler. A rear storage container for peeled fruit is placed after the peeler. The two frames are separated by a distance slightly greater than the width of the trunk of the trees to be harvested. A longitudinally movably clamp for clamping a tree to be shaken is movable along a longitudinal guide on one of the frames. A feeler supported on one frame contacts the tree and activates the clamp to shake the tree.

16 Claims, 7 Drawing Sheets

MACHINE FOR HARVESTING TREE FRUIT

BACKGROUND OF THE INVENTION

The present invention relates to a machine for harvesting tree fruit, which comprises a structure mounted on wheels bearing a tree shaker and a fruit peeler, as well as storage containers.

Machines with this function are already known. They are meant to be connected to a tractor and which have a structure which is fully placed under the tree tops. This structure is provided, on one of its sides, with an opening through which the structure embraces the tree to be harvested. The structure includes an inverted umbrella which forms the fruit collection surface and a shaker mounted above the umbrella.

These machines have a limited performance, due to the time interval between the end of shaking of one tree and the moment in which the machine is ready and coupled to the following tree. In addition, more than one person is generally required for its operation.

SUMMARY OF THE INVENTION

The object of the present invention is a machine meant for the aforementioned purpose, constructed so that it can obtain a high performance as no preparation is required between the end of shaking one tree and the start of the following tree, with the various stages of approaching the tree, coupling to it, shaking, collection and peeling of the fruit performed in a continuous manner, without having to stop the machine, allowing a quick and efficient harvesting of the fruit. Additionally, the machine of the invention may be self-powered or towed, and in any case it can be operated by a single person.

According to the invention, the structure of the machine comprises two parallel vertical gantries connected through the bottom end of their side arms by two longitudinal frames which run inside the arms. Each frame runs between the two arms on the same side of the two frames, and is provided with a rear container for storing peeled fruits. Prior to the container, there is a peeler. The two frames are separated by a distance which is slightly greater than the width of the largest trunks of the harvested trees.

The two frames form closed upper surfaces which are inclined transversely in a downwards sense towards the inner edge, defining two fruit collection trays which output towards the separation between the frames. On its bottom each tray ends in a longitudinal lower duct with a feed screw. Each feed screw ends at the input of its peeler. The inclined trays output on these ducts and the screws drive the fruit towards the corresponding peeler.

One frame is provided above the fruit collection tray with longitudinal guides, along which a shaker may move. A clamp on the one frame can move transversely above the separation between the two longitudinal frames. The clamp has arms that are mobile so that they may engage and release trees, as described further below.

The separating space between the frames is further crossed by a feeler which causes an electric or hydraulic system to activate the shaker when the feeler meets a tree trunk. The shaker is stopped by an adjustable timer, obtaining the time required for each type of tree to be shaken.

The longitudinal guides on which the shaker is mounted may comprise a bar placed parallel to the inner edge of the trays. The shaker may move on the bar. The shaker is also connected to a hydraulic drive cylinder for it moving the shaker along the guides.

The space separating the frames is spanned by flexible straps which extend from the screw grooves for the fruit conveying screws, forming a span roof which encloses the separating space.

According to an alternate embodiment, the machine may be provided with a storage hopper at the rear, immediately behind each frame. Preceding this hopper, there is a respective peeler of the corresponding side, which outputs on the hopper. The longitudinal duct and feed screw extend beneath the hopper until reaching and outputting on the peeler of the same side.

With this construction the structure of the machine is not altered nor interfered with, as the peeled fruit storage hopper are placed after it, and it is only necessary to extend the longitudinal duct and feed screw under said hoppers.

In this manner the machine is provided with storage containers for peeled fruit which do not change the general structure of the machine and offer a large capacity with simple emptying and filling processes, simplifying discharge to storage and/or transportation means.

These and further characteristics of the invention may be understood better in view of the following description made with reference to the accompanying drawings, in which is shown for purposes of illustration only an example of an embodiment.

DESCRIPTION OF THE PREFERRED EMBODIMENT

As may be seen in FIGS. 1 to 7, the machine of the invention includes a structure comprising two parallel vertical gantries (1) and (2). These gantries have side arms and they are connected at the bottom ends of their side arms by frames (3) and (4), which in turn bear lower support wheels (5) for moving the machine.

Frames (3) and (4) run inside the respective side arms of the gantries (1) and (2) and have a downwards inclination towards the center of the machine. The frames are closed on their tops by continuous surfaces (6) which define fruit collection trays. Each frame (3) and (4) includes inward of the trays (6) corresponding longitudinally extending ducts (7) inside which run respective feed screws (8) which are rotated to move fruit along the ducts.

Figure 5:
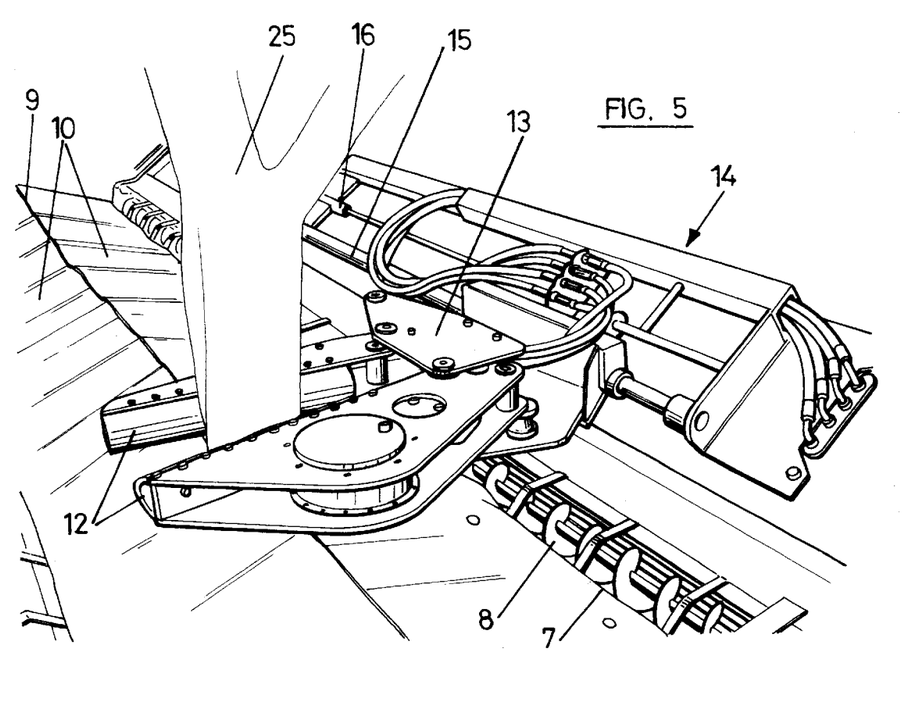
FIGS. 5 and 5a are enlarged perspective views of the shaker mechanism.

Frames (3) and (4) are separated on their inner sides by a distance which is slightly larger than the width of the trees to be harvested. This separation between frames is enclosed by a span roof (9) which, as seen in FIG. 5, comprises flexible straps (10) which extend from the inner edge of ducts (7).

Figure 5A:
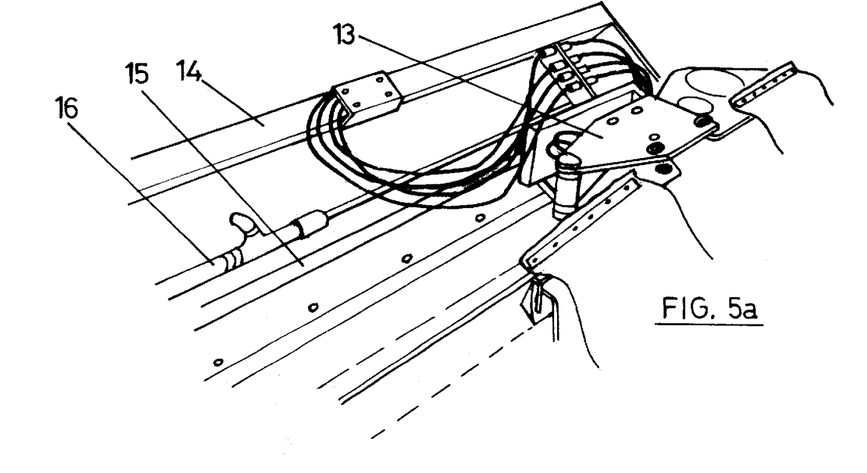

One of the frames (4) carriers a shaker (11) above the tray (6) as described with reference to FIGS. 5 and 5a.

Shaker (11) comprises clamps (12) which in their shaking position transversely span the separation between the frames (3) and (4) above the roof (9). The shaker is mounted through its body (13) on a support (14) which comprises a bar (15) that extends parallel to ducts (7) and screws (8), and along which the body (13) may travel. In addition, the body 13 is connected to a hydraulic cylinder (16) which drives the shaker unit along the bar (15).

Figure 6:
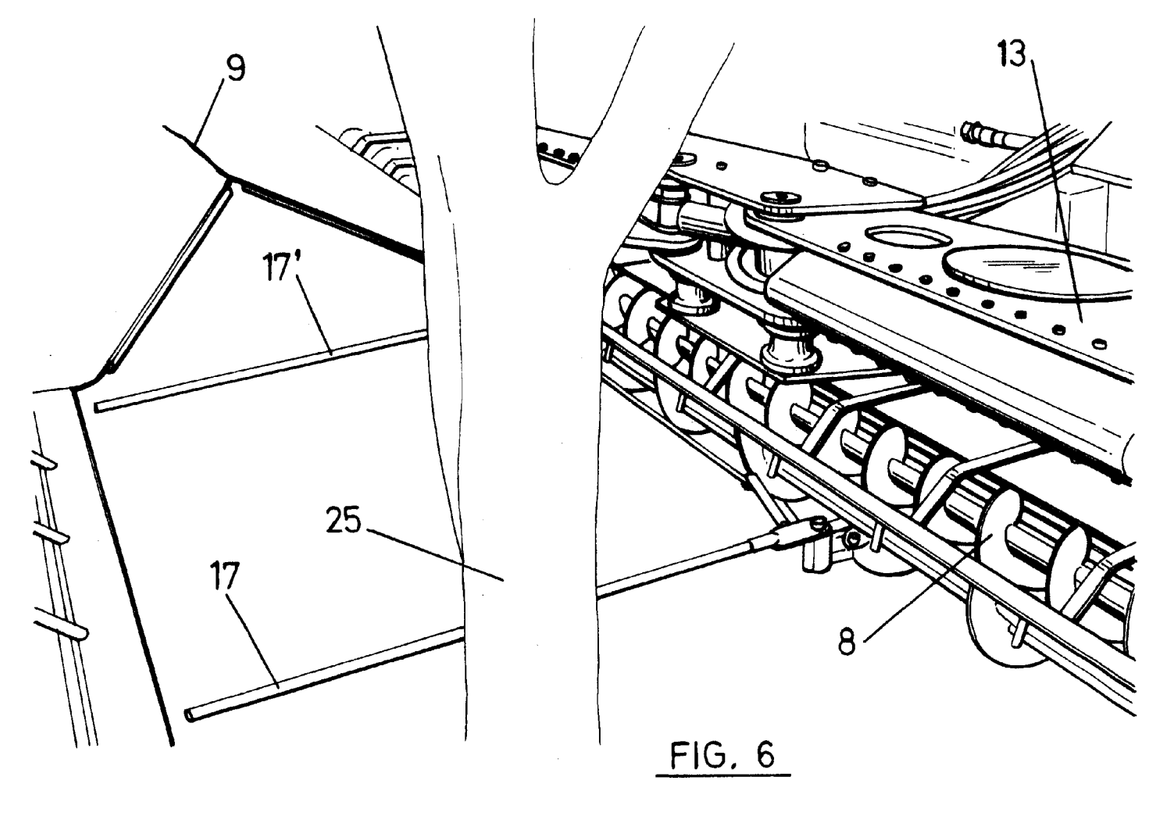
FIG. 6 is an enlarged perspective view of part of the shaker, the feeler and one of the feed screws.

The separation between the frames (3) and (4) is spanned by a feeler (17) shown in FIG. 6, which comprises a rod jointed to one of the frames, under the screw ducts. By means of an electric and hydraulic system, this feeler activates and operates the cylinder (16) which drives the shaker, as well as opening its clamps (12) as described further below.

Figure 7:
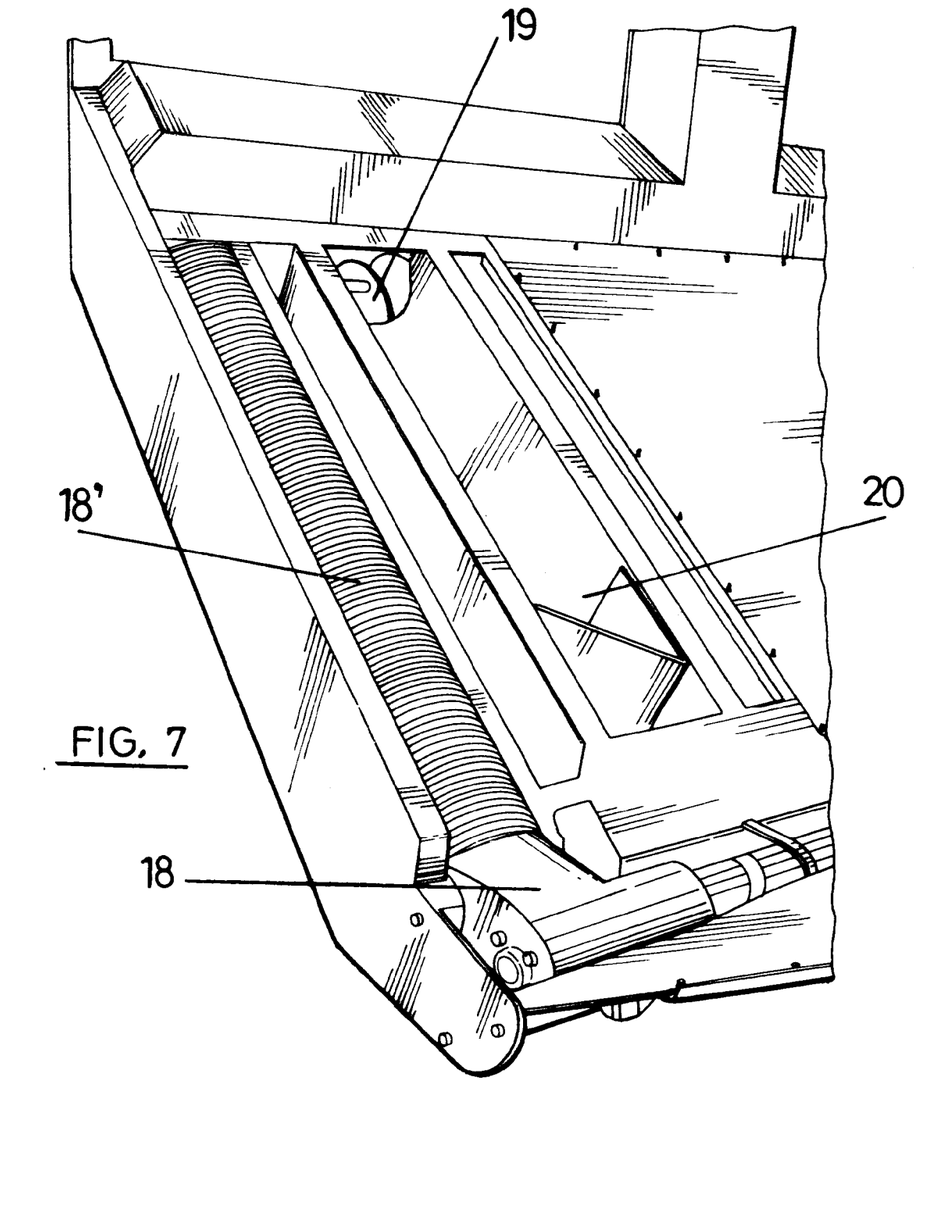
FIG. 7 is a perspective view of one of the feelers included in the machine of the invention.
Figure 8:
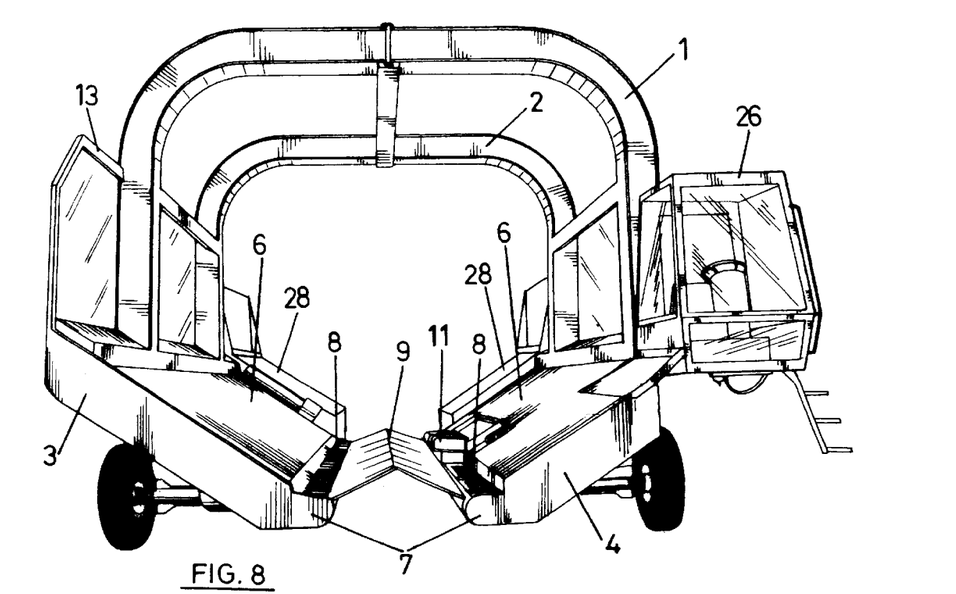
FIG. 8 is a front elevation view of an alternative embodiment of the machine.
Figure 9:
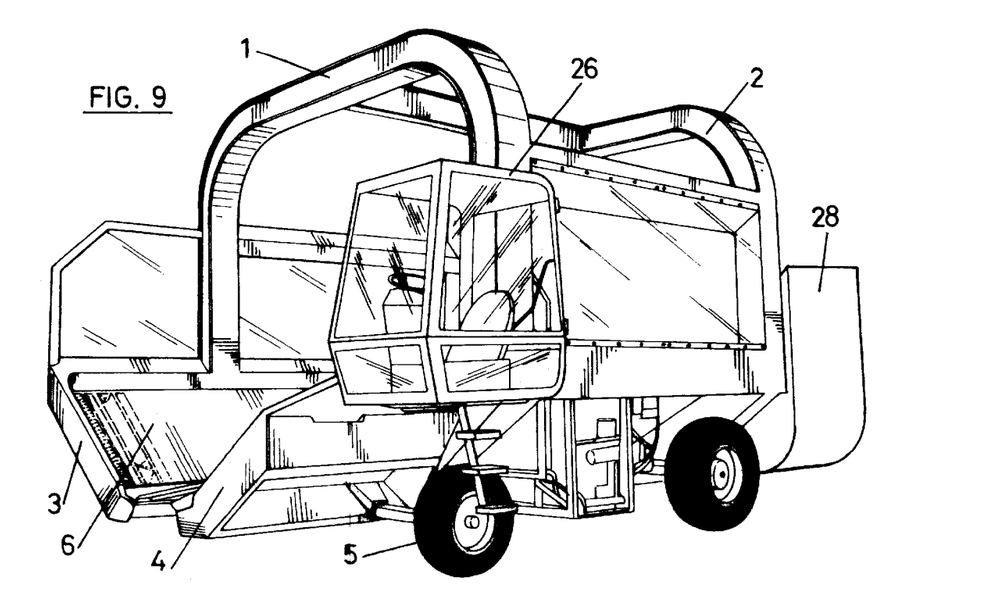
FIG. 9 is a front perspective view of the machine shown in FIG. 8.

Screws (8) carry dislodged fruit collected by the trays (6) to peelers (18) which are mounted on the rear of the frames. These peelers are shown in FIG. 7 and include a grille (18') through which the peel rinds are expelled, leaving the fruit free of its peel. Clean fruits are deposited by means of an endless screw (19) directly from each peeler in a container (20).

With the above construction, in order to harvest fruit, the machine is driven so that the trunk 25 of the tree to be shaken in FIGS. 5 and 6 is opposite the separation between the frames (3) and (4). The machine is advanced so that the trunk enters the space between the frames until it reaches the feeler (17). At that time, the shaker is activated, closing its clamps (12) until they rest and press on the tree trunk (25). This is immediately followed by the shaking operation as the cylinder for driving the shaker is activated, which occurs with a speed equal to that of the displacement of the machine. This shaking operation lasts for a period of time, which depends on the type of tree shaken, and it is controlled by an adjustable timer or by a feeler (17') which then opens clamps (12) and which release the tree trunk, allowing the machine to continue on its path without interference from the trunk. After this the hydraulic cylinder (16) moves the shaker in the opposite direction thus leaving the machine ready for a new operation.

A machine is thus provided in which the various processes take place without requiring any stoppages, enabling successive shakings without stopping the machine.

The machine of the invention is particularly applicable to all types of fruit trees by simply changing the feed screws and the type of feeler, in view of the fruit to be harvested.

The machine of the invention may be provided with driving means or be towed by a tractor or any other harvester mechanism.

Figure 1:
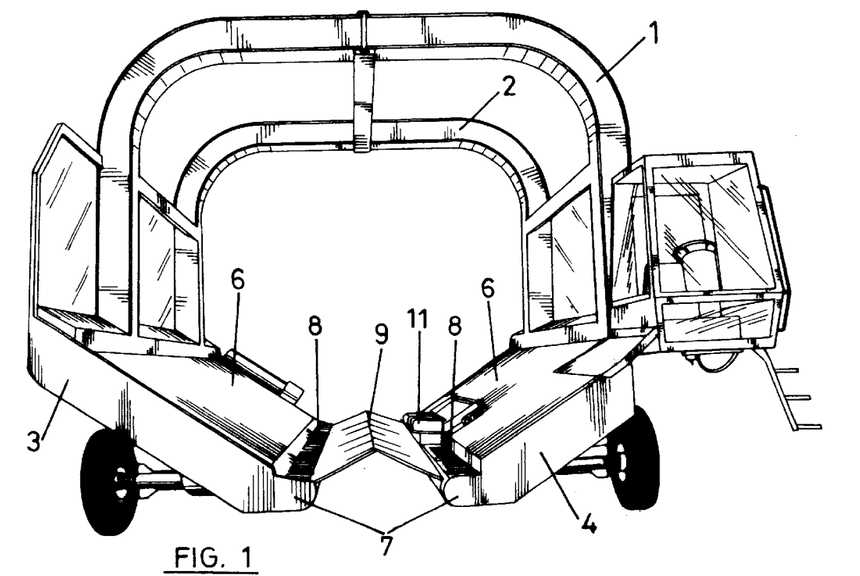
FIG. 1 is a front elevation view of the machine.
Figure 2:
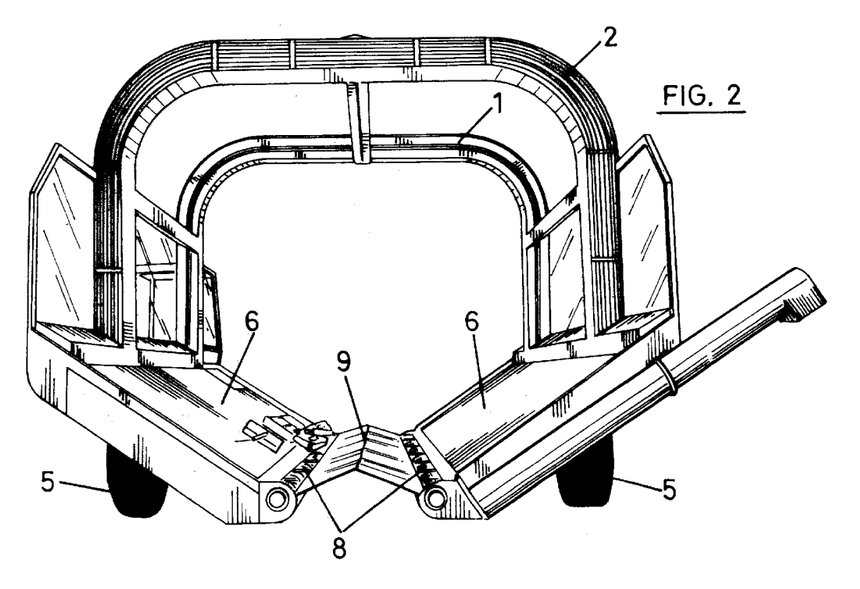
FIG. 2 is a rear elevation view of the machine.
Figure 3:
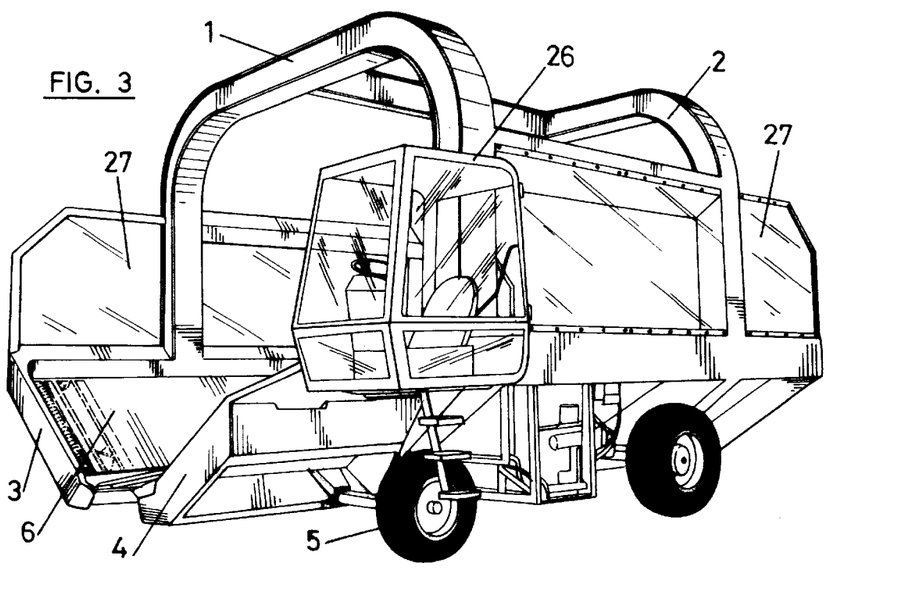
FIGS. 3 and 4 are front and rear perspective views of the machine.
Figure 4:
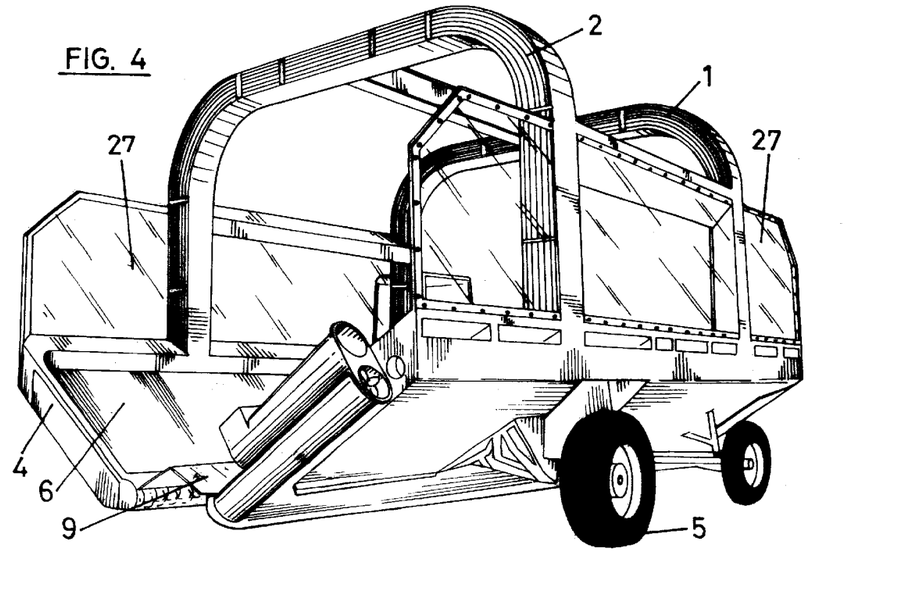

As shown in FIGS. 1 and 3 the machine also includes a control cab (26) and side enclosures (27) above the frames (3) and (4).

According to the embodiment of FIGS. 8 to 11, the machine includes in its rear after each frame (3) and (4) a storage hopper (28), under which extend the ducts (7) and the feed screws (8). These hoppers receive peeled fruit from peelers (29) which have a known construction.

Ducts (7) with the corresponding screws (8) discharge into the peelers (29), which in turn discharge into the hoppers (28).

Figure 10:
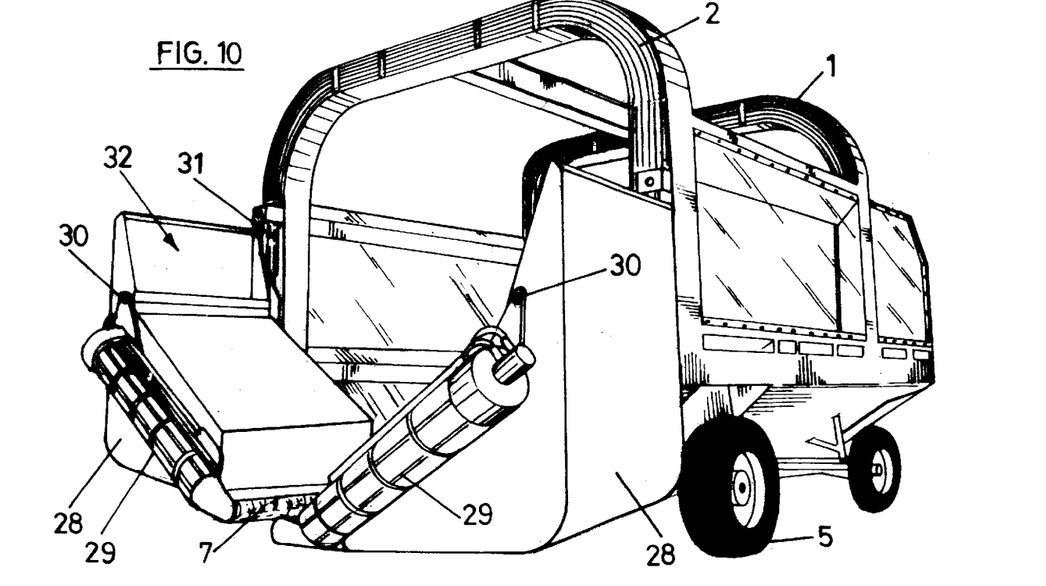
FIG. 10 is a rear perspective view of the machine of FIG. 8 with the hoppers in their loading position.
Figure 11:
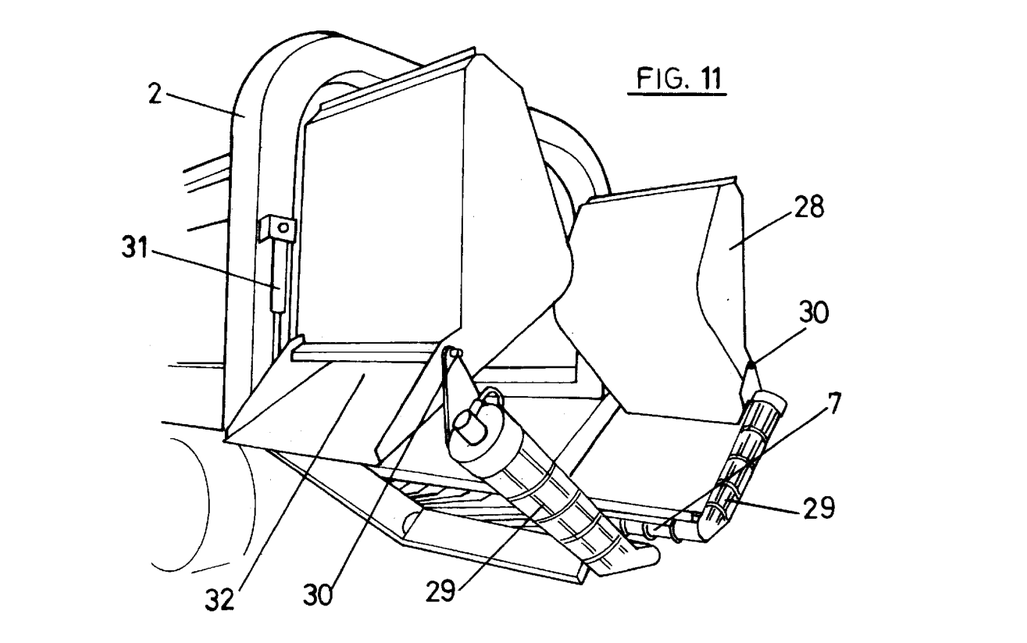
FIG. 11 is a partial rear perspective view of the machine of FIG. 8 with the hoppers in their discharge position.

As seen in FIGS. 10 and 11, hoppers (28) are mounted on rocking axes (30) and are connected to drive cylinders (31). Above axes (30) the hoppers are provided with an opening or discharge nozzle (32). Hoppers (28) may turn on axis (30) between a storage position shown in FIG. 10, in which the discharge opening (32) is placed above axis (30), and a discharge position shown in FIG. 11 in which they are inverted with opening (32) beneath axis (30). The hoppers are moved from one position to another by the action of drive cylinders (31).

With this arrangement the machine is provided, behind each frame (3) and (4), with a large capacity container without affecting the structure or overall construction of the machine.

Additionally, the hoppers (28) are emptied by the machine's own means, using cylinders (31) to invert the hoppers. In that position, the discharge opening (32) is placed at a height so that the fruit can be directly received by containers or packages, or by trailers or other transporting vehicles.

Although the present invention has been described in relation to a particular embodiment thereof, many other variations and modifications and other uses will become apparent to those skilled in the art. It is preferred, therefore, that the present invention be limited to not by the specific disclosure herein, but only by the appended claims.

What is claimed is:

1. A machine for harvesting tree fruit, comprising:

at least one gantry including two spaced apart side arms, a respective frame supported on each of the arms and the frames extending inside the arms and extending toward each other until an inward edge thereof and each frame being of size and being so placed that the frames are separated, spaced apart at a selected distance greater than the width of a tree trunk that is to be shaken by the machine;

each frame having an upper surface which is inclined inwardly and downwardly toward the inward edge thereof and which defines a fruit collection tray;

a longitudinal duct at the inward edge of each tray, the duct having an end; and a fruit conveyor at each duct for conveying fruit toward the end of the duct;

a longitudinal shaker guide above one of the fruit collection trays;

a shaker supported on and movable along the longitudinal guide, the shaker comprising clamping elements which are supported by the guide for the shaker above the separation between the frames and the clamp elements being clampable on a tree to be shaken;

a feeler extending into the space separating the frames for feeling contact with a tree to be shaken, and an activating connection between the feeler and the shaker when the feeler feels a tree and the tree is then positioned for being shaken by the shaker.

2. The machine of claim 1 further comprising two of the gantries parallel to each other and each gantry including a respective two of the side arms, and the frames being joined to the side arms of the two gantries.

3. The machine of claim 2, wherein the gantry side arms have bottom ends and the frames are at the bottom ends of the gantry side arms.

4. The machine of claim 1, wherein the fruit conveyor comprises a feed screw in each of the ducts for feeding fruit toward the end of the duct.

5. The machine of claim 1, further comprising a shaker drive cylinder operable upon being activated by the feeler for driving the shaker to shake the tree.

6. The machine of claim 1, wherein the feeler comprises a rod movably jointed to one of the frames and the rod being so placed and of a length to span the distance between the frames.

7. The machine of claim 6, wherein the feeler is beneath the longitudinal ducts at the frame.

8. The machine of claim 1, wherein the longitudinal guide for the shaker comprises a bar extending parallel to the inner edge of the respective tray on which the shaker may be moved.

9. The machine of claim 8, further comprising a hydraulic drive cylinder connected on the shaker for moving the shaker along the bar for selectively positioning a shaker at the tree to be shaken.

10. The machine of claim 1, further comprising opposing flexible straps extending from each of the ducts toward the other duct and also being inclined upward from the respective duct toward the other duct, the flexible straps defining a span roof covering the separation between the frames.

11. The machine of claim 1, further comprising fruit peelers at the rear of the trays towards which fruit is conveyed by the conveyor.

12. The machine of claim 11, further comprising a storage hopper past the peelers.

13. The machine of claim 11, further comprising storage hoppers past the trays and toward which the conveyor conveys fruit.

14. The machine of claim 1, further comprising a respective storage hopper for fruit located behind each frame and beyond the end of each duct;

a peeler placed preceding the storage hopper for peeling fruit.

15. The machine of claim 14, wherein the longitudinal duct and the feed screw extend beneath the hopper as far as the peeler, and the peeler discharges to the hopper.

16. The machine of claim 15, wherein the hopper is mounted on a horizontal rocking axis that extends parallel to a longitudinal direction of the duct, a drive cylinder connected with the hopper for rotating the hopper around the rocking axis, a discharge opening in the hopper located above the rocking axis.

* * * * *